(12) United States Patent
Nishida et al.

(10) Patent No.: US 7,209,751 B2
(45) Date of Patent: Apr. 24, 2007

(54) SYSTEM AND METHOD FOR PROXIMITY MOTION DETECTION IN A WIRELESS NETWORK

(75) Inventors: Yoshifumi Nishida, Yokohama (JP); Atsushi Shionozaki, Tokyo (JP)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 190 days.

(21) Appl. No.: 10/814,419

(22) Filed: Mar. 30, 2004

(65) Prior Publication Data
US 2005/0221829 A1   Oct. 6, 2005

(51) Int. Cl.
*H04B 17/00* (2006.01)
*H04Q 7/20* (2006.01)
*G01S 3/02* (2006.01)

(52) U.S. Cl. ............... 455/456.1; 455/440; 455/67.11; 342/450; 342/451; 342/458

(58) Field of Classification Search ............... 455/430, 455/438, 440, 506, 556.1, 513, 67.11, 456.1; 370/332, 333; 342/458, 461, 450, 451, 465
See application file for complete search history.

(56) References Cited

U.S. PATENT DOCUMENTS

| | | | |
|---|---|---|---|
| 6,658,091 B1 | 12/2003 | Naidoo et al. | |
| 6,674,403 B2 * | 1/2004 | Gray et al. | 342/463 |
| 6,879,812 B2 * | 4/2005 | Agrawal et al. | 455/67.11 |
| 7,057,556 B2 * | 6/2006 | Hall et al. | 342/378 |
| 2002/0132585 A1 | 9/2002 | Palermo et al. | |
| 2002/0170064 A1 | 11/2002 | Monroe et al. | |
| 2003/0013146 A1 | 1/2003 | Werb | |
| 2003/0069002 A1 | 4/2003 | Hunter et al. | |
| 2003/0119527 A1 | 6/2003 | Labun et al. | |
| 2003/0139188 A1 * | 7/2003 | Chen et al. | 455/456 |
| 2004/0000996 A1 | 1/2004 | Addy | |
| 2004/0024851 A1 | 2/2004 | Naidoo et al. | |
| 2004/0030753 A1 | 2/2004 | Horitz | |
| 2005/0208952 A1 * | 9/2005 | Dietrich et al. | 455/456.1 |
| 2005/0243936 A1 * | 11/2005 | Agrawala et al. | 375/259 |

(Continued)

OTHER PUBLICATIONS

Nardone et al., "A Closed-Form Solution to Bearings-Only Target Motion Analysis," Copyright 1997, IEEE Journal, vol. 22.*

(Continued)

*Primary Examiner*—Quochien B. Vuong
*Assistant Examiner*—Andrew Wendell
(74) *Attorney, Agent, or Firm*—John P. O'Banion

(57) ABSTRACT

Systems and Methods are described for determining proximity motion of a mobile wireless device around a fixed target node. The present invention provides a method of regressively analyzing the signal strength on a receiver node, which may be either the mobile wireless device or the fixed target node, as a function of time to determine the proximity of the sending node, which may be either the mobile wireless device or the fixed target node, to the receiving node. The method includes detecting motion of mobile wireless device with a fixed wireless device within a proximity range of less than about 15 cm, and more preferably within around 5 cm. The system provides accurate proximity motion sensing that is not susceptible to multipath effects, and which can be implemented in a wide variety of wireless applications.

37 Claims, 6 Drawing Sheets

U.S. PATENT DOCUMENTS

2005/0277426 A1* 12/2005 Evans et al. .............. 455/456.1
2006/0119516 A1* 6/2006 Krumm et al. ............. 342/451

OTHER PUBLICATIONS

Azuma, R. "Tracking requirements for augmented reality," Communications of the ACM, vol. 36, No. 7, pp. 50-51 (1993).
Bahl, P. et al. "Radar: An in-building RF-based user location and tracking system," Proc. IEEE Infocom, Tel-Aviv, Israel, Mar. 2000.
Bahl, P. et al. "A software system for locating mobile users: design, evaluation, and lessons," Feb. 2000, available at http://research.microsoft.com/~padmanab/papers/radar.pdf.
Want, R. et al. "The active badge location system," ACM Transactions of Information Systems, vol. 10, No. 1, pp. 91-102 (1992).

* cited by examiner

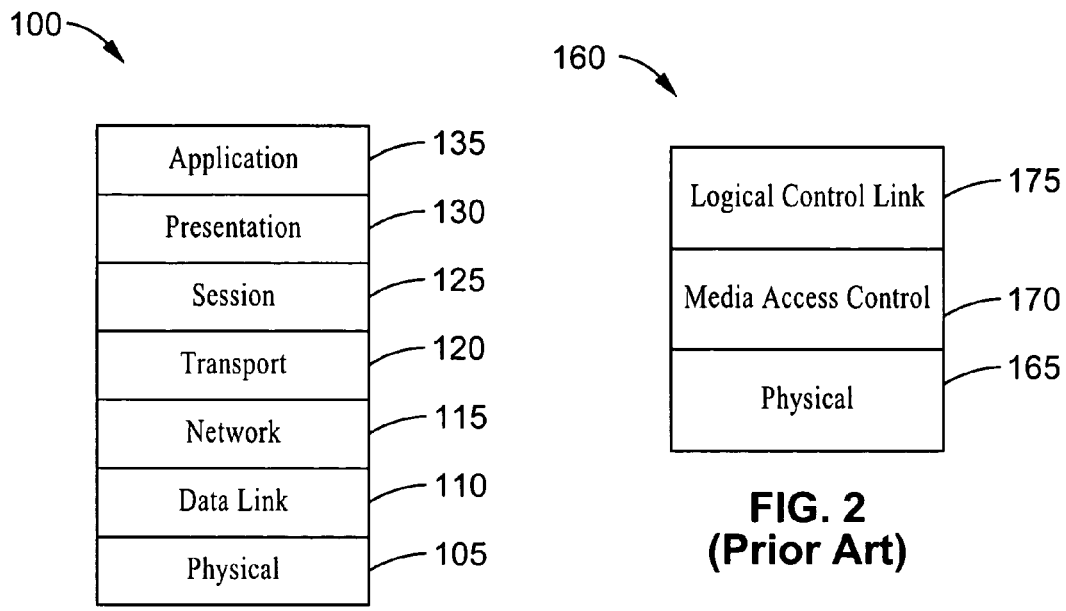
FIG. 1
(Prior Art)
FIG. 2
(Prior Art)
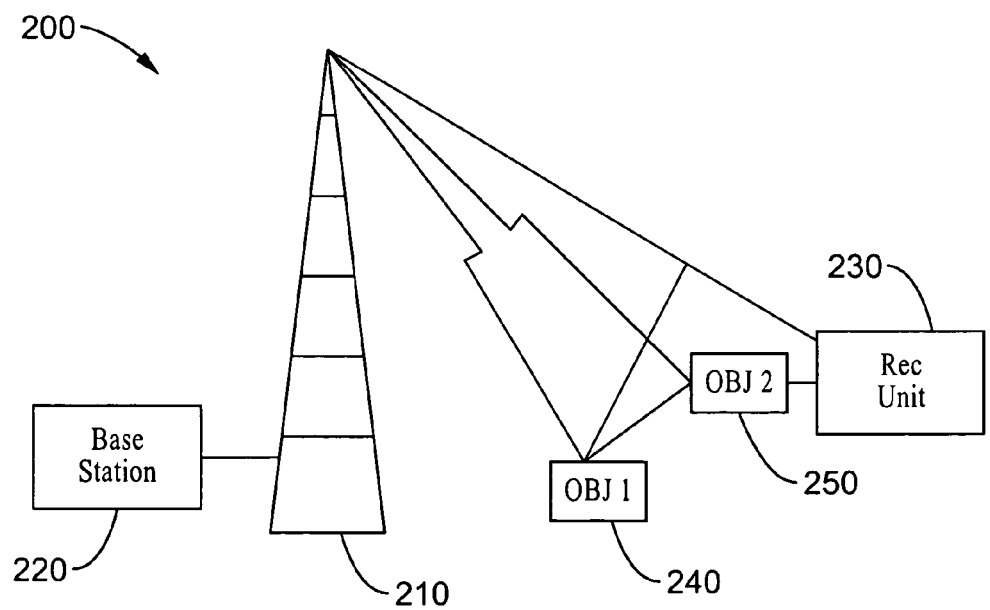
FIG. 3
(Prior Art)

SYSTEM AND METHOD FOR PROXIMITY MOTION DETECTION IN A WIRELESS NETWORK

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to wireless communication data processing, and more particularly to proximity motion detection within wireless nodes, such as IEEE 802.11 wireless nodes.

2. Description of Related Art

The Open System Interconnection (OSI) standard provides a seven layered hierarchy between an end user and a physical device through which various network systems can communicate. Each layer is responsible for different tasks and the OSI specifies the interaction between layers while ensuring that the communication devices comply with the standard.

FIG. 1 shows the hierarchy 100 of the seven-layered OSI standard. As shown in the figure the OSI standard includes a physical layer 105, a data link layer 110, a network layer 115, a transport layer 120, a session layer 125, a presentation layer 130 and an application layer 135.

The physical layer 105 conveys the bit stream through the network at the electrical, mechanical, and functional level, therein providing a hardware means of sending and receiving data on a carrier. The data link layer 110 provides the representation of bits on the physical medium and the format of messages on the physical medium, sending blocks of data, such as frames, with proper synchronization. The networking layer 115 handles the routing and forwarding of the data to proper destinations, while maintaining and terminating connections. The transport layer 120 manages the end-to-end control and error checking to ensure complete data transfer. The session layer 125 sets up coordinates, and terminates communications between applications. The presentation layer 130 converts incoming and outgoing data from one presentation format to another. The applications layer 135 is where communications, quality of service, user authentication, and so forth are considered.

Similar to the OSI standard, the IEEE 802.11 committee has developed a three layer architecture for wireless networks that roughly corresponds to the physical layer, the data link layer of the OSI standard. FIG. 2 shows the IEEE 802 standard 160. As shown in the figure, the IEEE 802.11 standard includes a physical layer 165, a media access control (MAC) layer 170, and a logical link control layer 175. The physical layer 165 operates in a similar manner to the physical layer within the OSI standard. The MAC layer and the logical link control layers share the functions of the data link layer in the OSI standard 100. The logical link control layer 175 places data into frames that can communicate at the physical layer 165 and the MAC layer 170 manages communications over the data link, sending data frames and receiving acknowledgment (ACK) frames. Together the MAC layer 170 and the link control layer 175 are responsible for error checking as well as retransmission of frames that are not received and acknowledged.

The IEEE 802.11 MAC layer also defines the use of beacon frames being sent at regular intervals by an access point. The access point may act as a bridge between two networks with different protocols (e.g., Ethernet and 802.11 wireless networks).

Wireless technologies have been integrated into our daily lives and are being required to provide not only connectivity, but also high performance, reliability and stable communication. The most dominant of the 802 wireless communication standard is IEEE 802.11 and its variants, such as 802.11a, 802.11b, 802.11g which are being utilized in various wireless products. Communication between different nodes in an IEEE 802.11 based-network is performed by exchanging data frames between a sending node and a receiving node.

Each IEEE 802.11b frame transmitted from an IEEE 802.11 equipped device contains information including the signal strength of the frame and noise which may be measured to determine the source and destination of any particular frame. By measuring the signal strength information included in frames sent from a fixed node to a mobile node, it is possible to approximate the distance between fixed and mobile nodes.

However, wireless transmission under IEEE 802.11b are susceptible to the effects of multipath fading, wherein it can be very difficult to determine accurate location information for a node at any point in time. FIG. 3 illustrates a communication scenario 200 according to the IEEE 802.11 standards which are susceptible to the effects of multipath fading. As shown in the figure a transmission emitting from a base station 220 is transmitted by an antenna 210. The transmission may take a direct path to a receiving mobile node 230, or it may be reflected or diffused by one or more objects 240, 250, such as objects which are closer to antenna 210. The extent of multipath fading depends on the physical surroundings from which the multipath propagation of the signals directed towards receiving unit 230 arises.

In mobile wireless nodes the multipath propagation problem can be compounded by the motion of one of the nodes, providing a varying profile of multipath effects as at least one of the nodes moves in relation to the other. The occurrence of multipath propagation may cause the perceived signal strength information at a mobile node to fluctuate greatly as a result of the slightest movement of the mobile node or changes in the surroundings such as movement of obstacles in the line of sight. In 802.11b, beacon frames are periodically transmitted to synchronize multiple wireless devices. However, the use of periodical monitoring does not alleviate the inherent problem of IEEE 802.11 multipath fading.

Therefore, a need exists to monitor the signal strength in beacon frames in mobile devices to facilitate accurately determining their proximity relative to a stationary wireless target device. The present invention fulfills that need and others and overcomes numerous disadvantages with the prior art.

BRIEF SUMMARY OF THE INVENTION

The invention provides a data processing apparatus and method for optimizing network data processing between two wireless network nodes. The present invention generally allows the detection of a mobile wireless node relative to a fixed wireless node as the mobile wireless node motions in close proximity to the fixed wireless node.

The present invention can provide a level of optimization for detecting the presence of the mobile node as the mobile node is maneuvered towards the fixed node. If the two nodes are configured in IBSS mode, one of the nodes is configured as an access point, so that the other node acts as a client node for receiving frame beacons transmitted by the node acting as the access point. The client node then reads the signal strength information contained in the transmitted node in order to determine the proximity motion of the mobile node to the fixed node.

Multipath propagation can cause widely varying signal strength information at a mobile node in response to even the slightest movement. It has not, however, been fully appreciated in the art that when a human being is positioned in front of a fixed target 802.11b node and a handheld mobile node is maneuvered to within few centimeters proximity of the fixed node, the perceived signal strength continuously increases during this maneuver a majority of the time. This characteristic is made use of in the present invention for mitigating the multipath problem in providing motion detection.

The invention also provides a signal strength regression analysis algorithm that performs a regression analysis on the signal strength differences in a set of recorded signals transmitted between the mobile node and the fixed node to determine proximity motion of the mobile node.

The invention also provides for monitoring of the frequency at which the beacon sender sent out beacons to the receiving node. The beacon receiver records the signal strength information contained in the beacon and retains this information for a period of time. The accumulated signal strength information is regressively analyzed to determine proximity motion in the present invention.

The invention also describes a method of precalibrating signal strength increase between the sending node and the receiving node prior to the regression analysis of the signals transmitted as the mobile node is in proximity motion with respect to the fixed node.

The present invention can be described as a system for detecting proximity motion of a wireless device operating within a wireless network, comprising: (a) a first network device configured for wirelessly communicating beacon frames which include signal strength information with at least a second network device; and (b) means for detecting proximity motion in response to signal strength regression analysis when the first network device is within the proximity of the second network device. The means for detecting proximity motion can be described as comprising a (i) a motion monitoring module configured for continuously monitoring signal parameters within beacon frames; (ii) a regression analysis module configured for performing a regression analysis of signal strengths; and (iii) a motion detection module configured for comparing the output of the regression analysis against one or more thresholds to determine whether proximal motion has occurred.

The invention may also be described as a proximity motion detection system comprising: (a) a first network device configured for communicating wirelessly with at least a second network device; (b) means for communicating beacon frames containing signal strength information between said first network device and the second network device; (c) means for performing a signal strength regression analysis on received signal strength information; and (d) means for generating a proximity motion detection signal in response said signal strength regression analysis performed during close proximity relative motion between said first network device and the second network device.

The invention may be described as a method of detecting proximity motion between two wireless devices, comprising: (a) maneuvering a second mobile wireless device in relation to a first, fixed location, wireless device within a given proximity range; (b) continuously monitoring the strength of signals transmitted between the first target wireless device and the second mobile wireless device as the second wireless device moves towards the first wireless device; and (c) regressively analyzing the monitored signal strength to determine the proximity motion of the second mobile wireless device with respect to said first target wireless device to determine whether a given proximity range is achieved.

The invention may also be described as a method of detecting proximity motion between a first receiving wireless node and a second sending wireless node, comprising: (a) continuously monitoring beacon frames transmitted by the second sending wireless node to the first receiving wireless node; (b) recording the signal strength information contained in the beacon frame transmitted by the second sending wireless node; (c) retaining the recorded signal strength information in the first receiving wireless node for a designated period of time; and (d) regressively analyzing the retained signal strength information to determine the proximity motion of the second sending wireless node with respect to the first receiving wireless node.

It should also be appreciated that the invention may be described in numerous additional ways such as describing apparatus, systems and/or methods which incorporate one or more aspects of the invention as described herein.

The present invention is configured for providing numerous inventive aspects, including but not limited to the following.

An aspect of the invention is to provide motion detection of a wireless device node moving in a proximal relation to a fixed node.

Another aspect of the invention is to detect motion of wireless device operating according to IEEE 802.11.

Another aspect of the invention is to detect motion without the need of RF transponder tags, optical sensing mechanisms, or other hardware.

Another aspect of the invention is to detect incoming motion or access within a given proximity range.

Another aspect of the invention is to increase the accuracy of distance estimating utilizing beacon frame signal strength information.

Another aspect of the invention increase the accuracy of distance estimating to far less than the current 2–4 meter error bar.

Another aspect of the invention to provide a distance estimating system and method with reduced multipath susceptibility.

Another aspect of the invention to provide a motion sensing system which can be utilized without the need to perform system precalibration.

Another aspect of the invention are processes for determining motion which are used in combination with a "proximity motion" maneuver to increase the accuracy of motion detection.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a layer topology for the conventional OSI standard for a computer communication architecture.

FIG. 2 is a layer topology for the conventional IEEE 802.11 standard for a computer communication architecture.

FIG. 3 is a block diagram of a conventional fixed base communication scenario exhibiting multipath effects, such as fading.

DETAILED DESCRIPTION OF THE INVENTION

Referring more specifically to the drawings, for illustrative purposes the present invention is embodied in the apparatus generally shown in FIG. 4 through FIG. 11. It will be appreciated that the apparatus may vary as to configuration and as to details of the parts, and that the method may vary as to the specific steps and sequence, without departing from the basic concepts as disclosed herein.

The present invention provides for proximity mobile device detection in a wireless network. The invention incorporates a number of methods into the IEEE 802.11 protocol MAC layer to improve the signal strength between mobile wireless devices that communicate with a stationary wireless device in the wireless network. As is common in the conventional art, the IEEE 802.11 wireless network is known for the multipath fading when two wireless nodes try to communicate, the resulting fading generates errors which makes it difficult to determine the exact location of a mobile wireless device with respective to a stationary device in the same wireless network. Further problems associated with the proximity motion identification of wireless devices of a IEEE 802.11 network are also described which are overcome by preferred embodiments of the present invention.

Figure 4:
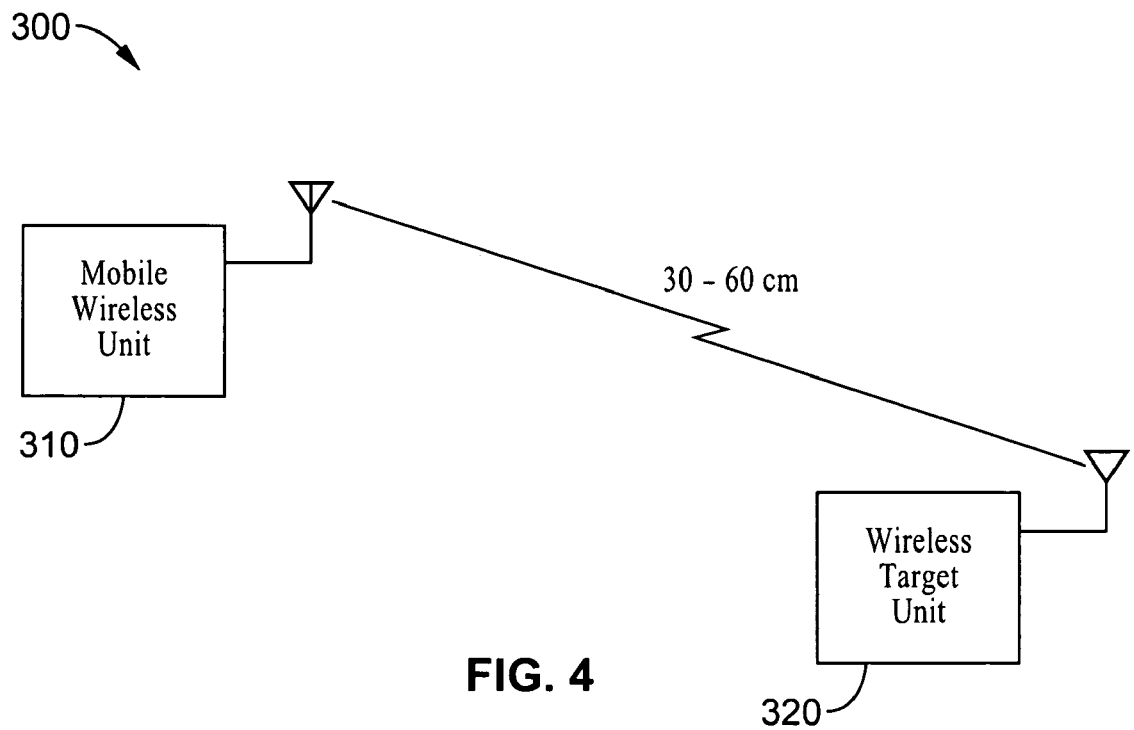
FIG. 4 is a block diagram of a first communication range between a wireless device and a fixed node, according to an aspect of the present invention.
Figure 5:
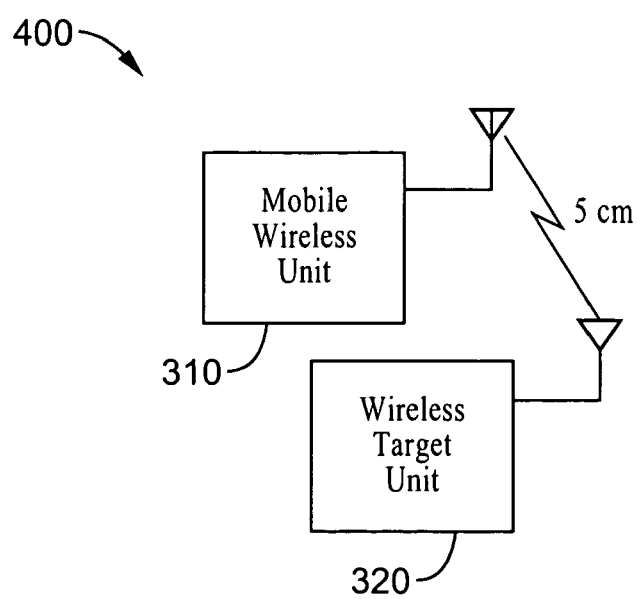
FIG. 5 is a block diagram of a second, proximal, communication range between a wireless device and a fixed node, according to an aspect of the present invention, showing proximal motion detection.

FIG. 4 and FIG. 5 illustrate a network established in an initial state 300 between a mobile wireless device (node) 310 that is in motion and placed within about 30–100 cm from the stationary wireless device (node) 320, and more preferably within the range of from 30–60 cm. From the initial state 300 shown in FIG. 4, a user holding the mobile wireless device 310 can quickly move it towards the stationary wireless device 320 so that the distance between the devices reduces. For example, in FIG. 5 the distance changes to a second state 400, a proximal distance state, between mobile wireless device 310 and proximal stationary wireless device 320, which are within a range below about 15 cm, and more preferably to a range of less than 10 cm, and most preferably to a range of at or less than about 5 cm. In FIG. 5, wireless device is within a short range 400 of the fixed node wherein the movement of wireless device 310 towards the stationary wireless device 320 is referred to as proximity motion. In one embodiment of the present invention, the proximity motion must terminate within approximately 0.7 to 1 second for optimal detection to occur. After a short maneuver, the handheld device 410 may be detected so that its position will not further influence the motion detection algorithm of the present invention. It should be noted that the portable (i.e. handheld) communications device (i.e. telephone, PDA, electronic watch, and so forth) can remain close to the fixed device, or simply swiped away in one action.

Figure 6:
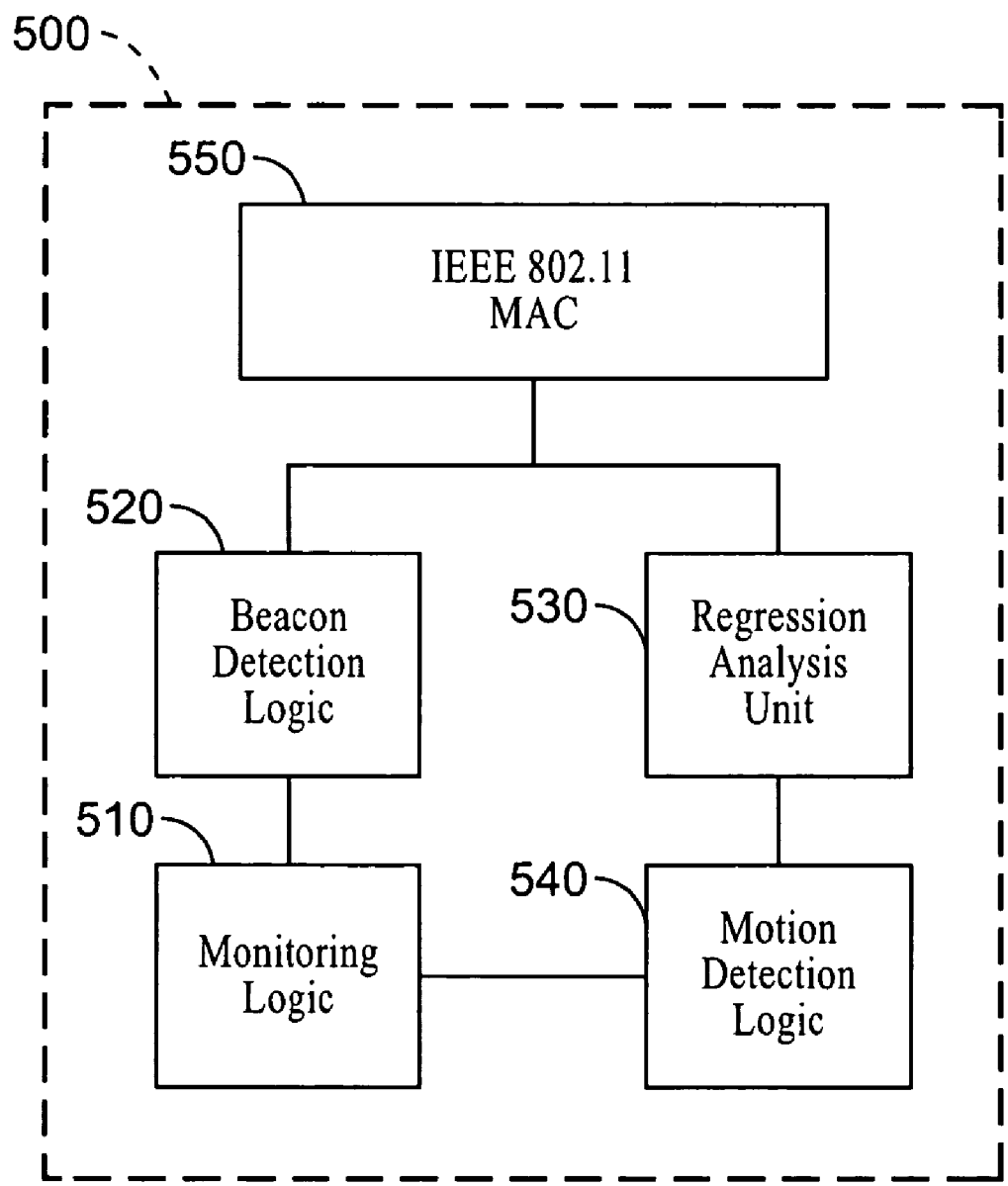
FIG. 6 is a block diagram of a wireless network according to an embodiment of the present invention, showing implementation of proximity motion detection.

FIG. 6 illustrates an embodiment 500 for performing proximity motion detection within the present invention. It will be understood by those skilled in the art that only those elements generally necessary for the implementation of the present invention are shown.

Proximity motion detection 500 preferably comprises motion (signal strength) monitoring module 510, beacon detection module 520, regression analysis module 530 and motion detection module 540. The functional components of the proximity motion detection logic 500 are preferably coupled to the IEEE 802.11 MAC layer 550. In one embodiment of the present invention, the motion monitoring module 510 continuously monitors signal parameters in beacon frames dispatched by the IEEE 802.11 MAC layer 550 to the wireless devices in the wireless network. The regression analysis module 530 performs a regression analysis of signal strengths to determine the proximity movements or motions, as within a short range 400, around a fixed target wireless node such as node 310 by the mobile wireless device such as node 320.

In one embodiment, the regression analysis module 530 can be implemented at either the beacon receiving node or sending node. In one embodiment, one of the wireless devices is expected to periodically transmit beacon frames and the other must record the signal strength information contained in the received frames. If the two devices are configured in IBSS mode, one of the devices must be configured as an access point, so that the other device which becomes the client node can receive the beacons sent out by the other node and be able to read the signal strength information contained therein. If the devices are configured to be in an ad hoc mode, the beacon sending device is determined randomly, so that the node measuring the signal strength information contained in the beacons will not be determined until communication starts between the two nodes.

In one embodiment of the present invention, the proximity motion detection algorithm could be implemented at either the beacon receiving node or the sending node. However, if the proximity motion detection algorithm is implemented at the sending node, the signal strength perceived at the receiving node must be reported back to the sender node.

In one embodiment, the proximity motion detection logic 500 could use approximate propagation characteristics of IEEE 802.11b signals indoors to determine the signal strength in signals communicated between the receiving node and the sending node. In one embodiment, the following equation can be used to approximate the characteristics of the signals between the two nodes:

$$P_d = P_{d0} - \alpha \log(d/d0) - \beta \qquad (1)$$

Where $P_d$ and $P_{d0}$ represent the sampled signal strength at distances d and d0 away from a wireless node. The values for alpha and beta are determined by the amount of interference between the wireless node and the sampling location. In one embodiment, when there are no major obstructing objects between the beacon sender and receiver, the values of $\alpha=10$ and $\beta=0$. In that case, Eq. 1 provides an accurate estimate of actual sampled signal strength.

Also, from Eq. 1, the signal strength may be affected by changes in distance and not by the transmit power of the sender. Thus, by basing the proximity motion detection algorithm of the present invention on Eq. 1 above, a compatible relationship between the beacon sender and receiver is maintained without the receiver being dependent on the type of sender in a heterogeneous environment. Therefore, if the handheld device is maneuvered in a proximity motion, the distance from the handheld device to the target device will change from approximately 30 to 60 cm to approximately 5 cm as depicted in FIG. 4–5. From the Eq. 1 above, for the type of motion contemplated in one embodiment of the present invention, the signal strength may be increased by about 20 dBm in response to such a proximity motion.

Although IEEE 802.11b can be severely affected by multipath phasing at longer ranges, it should be recognized that when communicating nodes are situated on the order of tens of centimeters to each other, there is hardly any resulting interference. In one embodiment of the present invention, during proximity motion, the receiver consistently observes a continuous increase in signal strength information contained in the beacon frames between the communicating nodes situated within a few centimeters from each other. The present invention therefore continuously monitors the beacon frames at the receiver side and analyzes the results to determine if the two nodes have moved in close range of each other.

Letting $P_{t0}$–$P_{tn}$ denote the sampled signal strength at the beacon receiver side from time $t_0$ to $t_n$ when a handheld node is maneuvered for proximity motion, a high degree of positive correlation between time t and signal strength $P_t$ is observed. Because of this relationship, when a simple linear regression analysis is performed on the receiver signal strength $P_t$ as a function of time t, it results in a highly precise regression equation. Since the perceived signal strength at the receiver node does not depend on the transmit power of the sender node, but increases constantly with respect to distance during proximity motion, the difference in signal strength at time t, $D_t$ with respect to time $t_0$ can be expressed by:

$$D_t = P_t - P_{t0} \qquad (2)$$

where $P_t$ is the signal strength at time t and $P_{t0}$ is the signal strength at time $t_0$.

If a simple linear regression analysis is performed on $D_t$ with respect to t, a constant result is obtained irrespective of the transmit power of the sender for proximity motion at the same distances. Furthermore, since IEEE 802.11b uses periodic beacon frames to synchronize the communicating nodes, these beacons are typically configured to be sent out at intervals of approximately 100 mS. However, in the present invention, the beacon frames can be preferably tuned for being sent out more frequently.

Figure 7:
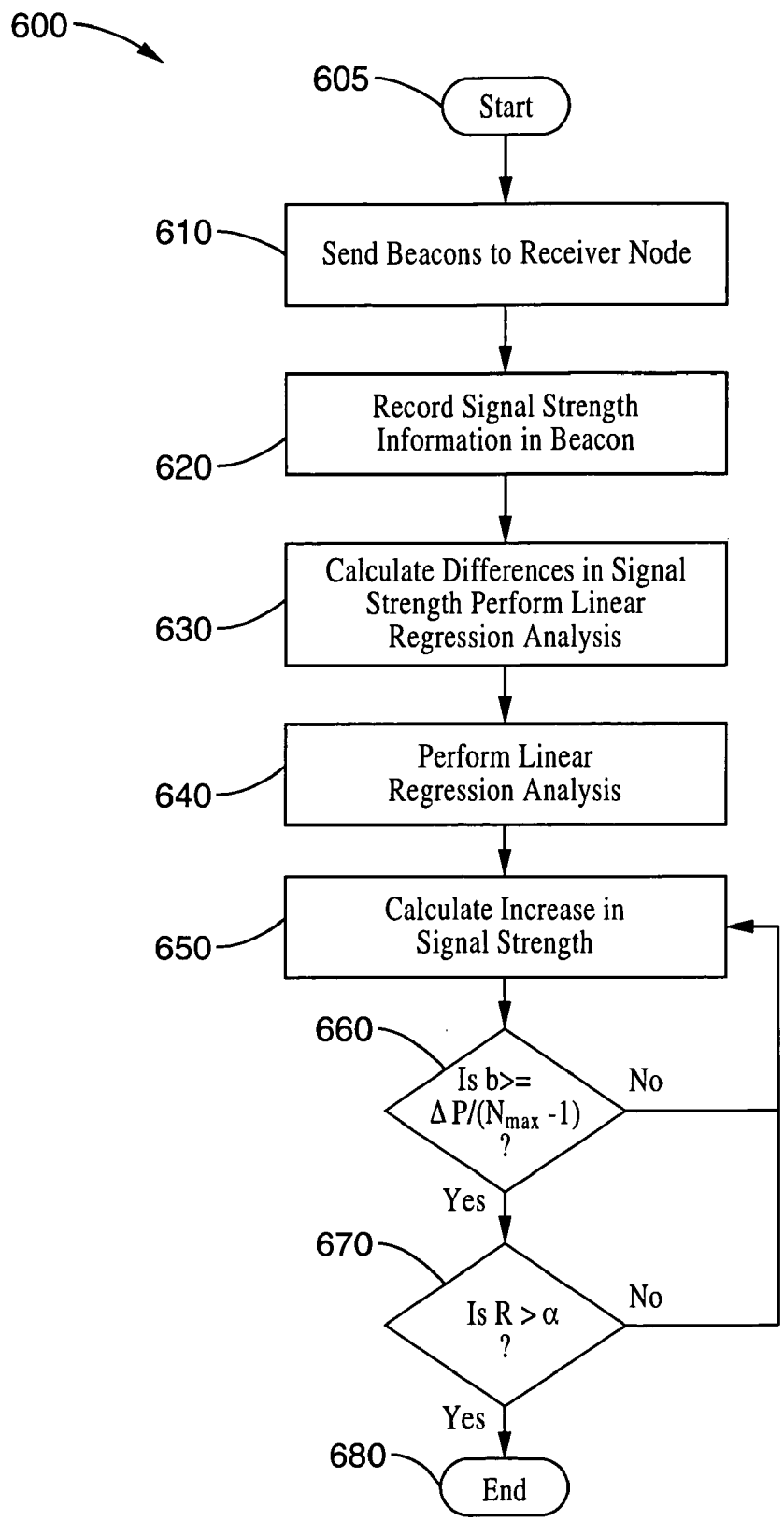
FIG. 7 is a flowchart of proximity motion detection according to an aspect of the present invention.

FIG. 7 is an illustration of proximity motion detection logic 600. The process starts at block 605 and the beacon sender is configured to periodically send out beacons at constant intervals as per block 610. In one embodiment, the constant beacon transmission interval is configured to be approximately less than 100 mS. However, the accuracy of the proximity motion detection algorithm of the invention can be increased according to the invention by decreasing the interval.

Next, the beacon receiver records the signal strength information contained in the beacon as per block 620. In one embodiment of the present invention, the beacon receiver retains the signal strength information for a period of time. Preferably the retention period is at least approximately one second. In another preferred implementation, the receiver discards the retained beacon information if the retained information is more than the retention time. For example, when the beacon interval is 100 mS, the receiver must save at least the last ten samples. If $P_n(n=1, 2, 3 \ldots n_{max})$ denotes the set of recorded signal strength samples, then as time t increases, each value of $P_n$ will reset with a newer value. Thus, $P_0$ will always represent the oldest sample and $P_{max}$ will always represent the newest sample.

Next, the proximity motion detection algorithm follows a set of procedures using the values for $P_n(n-0, 1, 2 \ldots n_{max})$ that represent the recorded signal strength information. Thus, at block 630, the proximity motion detection algorithm calculates the difference in signal strength denoted by $D_n(n-0, 1, 2 \ldots n_{max})$ with respect to $P_0$ using Eq. 2, where Dt is the difference in signal strength between time t and $t_0$, $P_t$ is the signal strength at time t, and $P_{t0}$ is the signal strength at time $t_0$.

Next, as per block 640, the proximity motion detection system performs a regression analysis on $D_n$ with respect to n and determines the regression coefficient b and the coefficient of determination R. In block 650, the proximity motion detection system next determines the increase in signal strength from the start to the end of the proximity motion. Proximity motion is preferably registered when the regression coefficient b can be approximated as $\Delta P/(n_{max}-1)$; where $\Delta P$ is the change in signal strength and nmax-1 is the total number of signal strength samples. Next the proximity motion detection system determines if the conditions of Eq. 3 are met as per block 660, and Eq. 4 as per block 670.

$$b \geq \frac{\Delta P}{n_{max} - 1} \quad (3)$$

$$R > \alpha \quad (4)$$

If the conditions of Eqs. 3 and 4 in block 660 and block 670 are satisfied, the processing algorithm ends at block 680. If, on the other hand, neither of the two conditions are satisfied, the proximity motion detection continues to calculate the start of the proximity motion to the end of the proximity motion. As mentioned above, the implementation of the present invention for detecting movement from about 30 cm to 60 cm separation to less than 5 cm, the change in the resulting signal strength change $\Delta P$ being approximately 20 dBm. In a regression analysis of signal strength, a threshold value for the coefficient of determination $\alpha$ which is higher than about 0.70 indicates a strong correlation. This level of correlation is indicative that proximity motion has been detected within the present invention.

The preferred value for the change in signal strength $\Delta P$ described above assumes conditions with minimal interference such as indoor environments. If it is difficult to accurately detect proximity motion with this value, it is possible, according to one mode of the present invention, to increase the accuracy by measuring $\Delta P$ beforehand and using the premeasured values.

Figure 8:
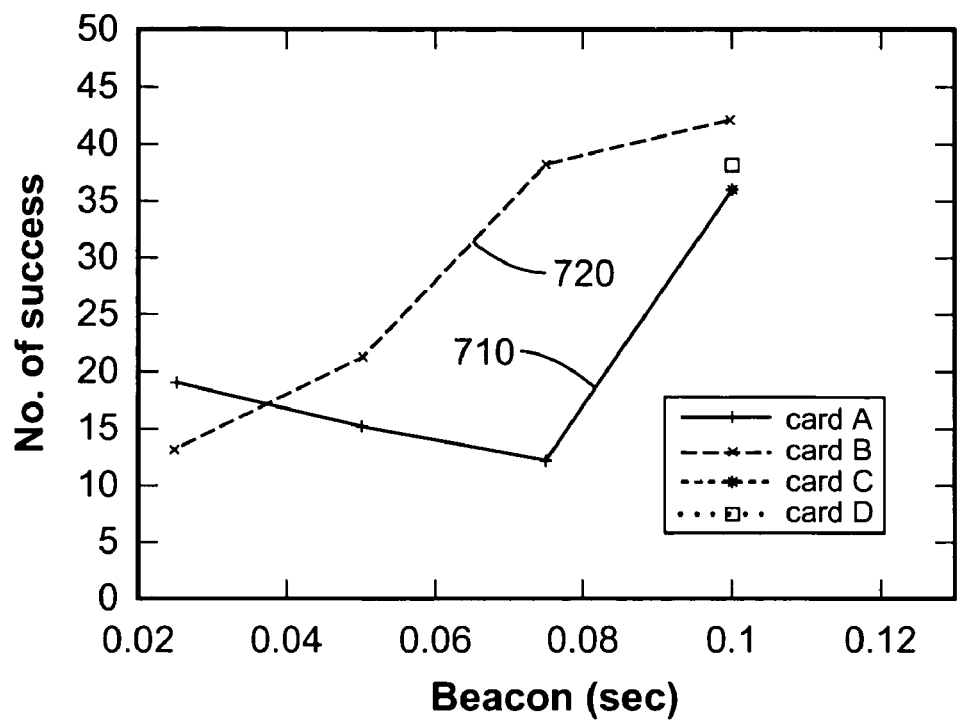
FIG. 8 is a graph depicting the accuracy of proximity motion detection when changing frame beacon intervals between a set of interconnected wireless devices according to the present invention.
Figure 9:
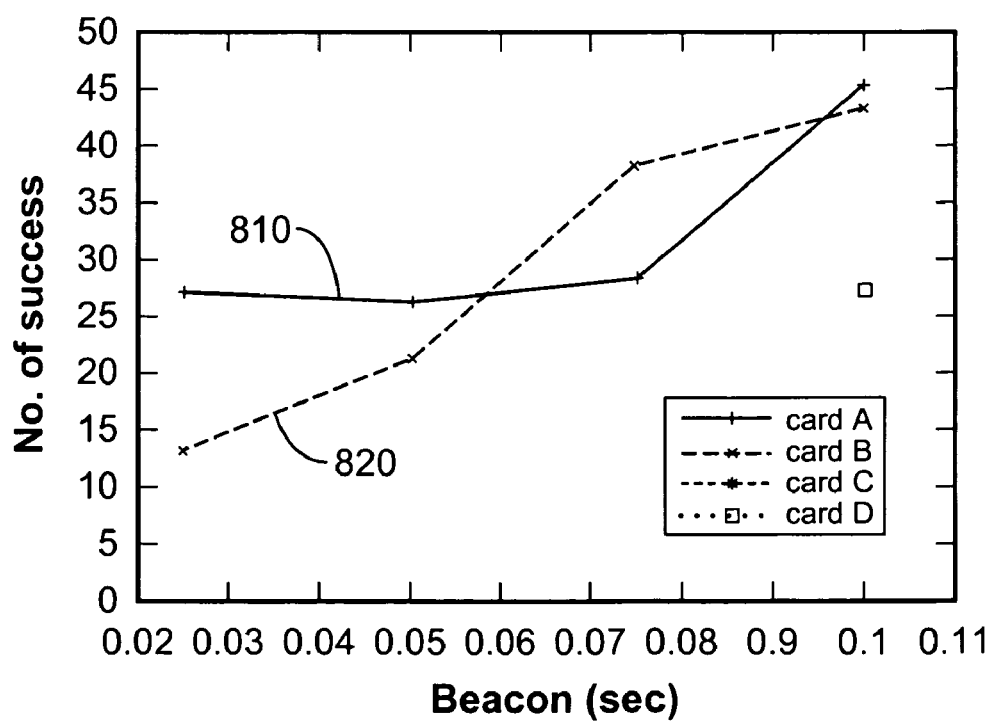
FIG. 9 is a graph depicting the accuracy of proximity motion detection when changing frame beacon intervals between a set of wireless devices with a second changed threshold value in the wireless network of the present invention.
Figure 10:
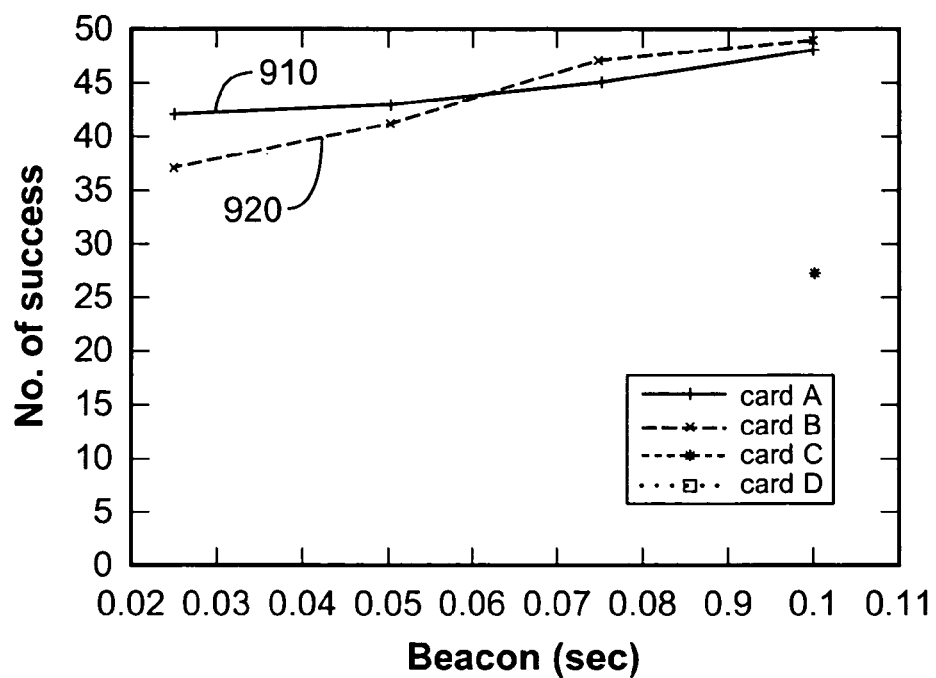
FIG. 10 is a graph depicting the accuracy of proximity motion detection when changing frame beacon intervals between a set of wireless devices with a third changed threshold value in the wireless network of the present invention.
Figure 11:
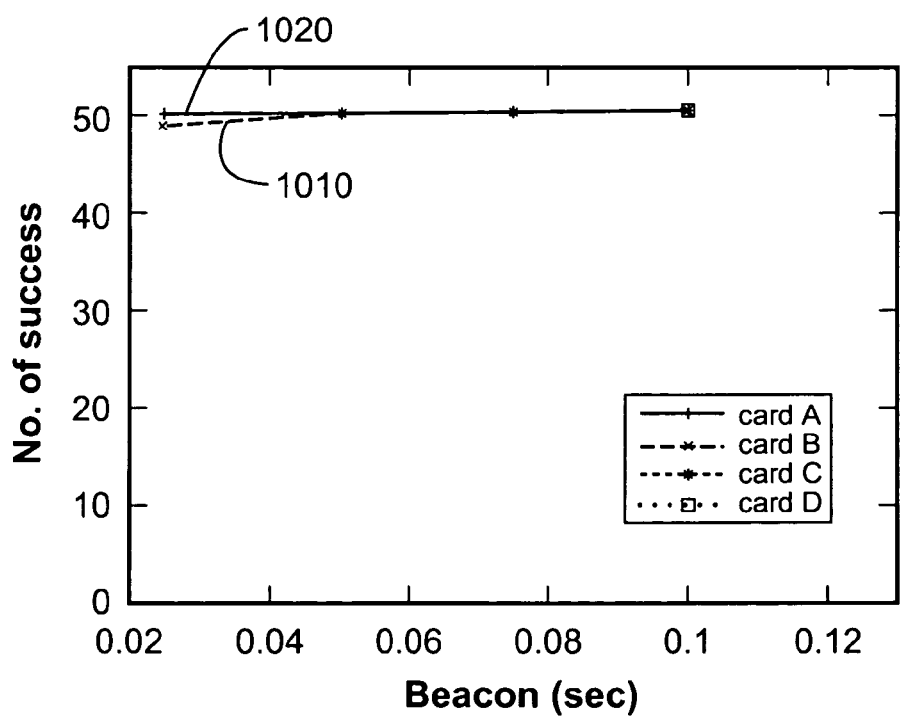
FIG. 11 is a graph depicting the accuracy of proximity motion detection measured when changing beacon intervals between a set of wireless devices with a fourth change in the threshold value in the wireless network of the present invention.

FIG. 8 through FIG. 11 illustrate results from evaluating the proximity motion detection method of the present invention, based on a couple of experiments performed using different brands of IEEE 802.11b network cards. The graphs illustrate the accuracy of proximity motion detection measured when changing the beacon intervals for each of the four types of IEEE 802.11b network cards. As shown in FIG. 8, the x-axis denotes the beacon interval and the y-axis denotes the number of times proximity motion was detected correctly out of fifty attempts. FIG. 8 shows the results for a coefficient of determination $\alpha$ of 0.78, while each of FIG. 9, FIG. 10 and FIG. 11 depict the results for coefficients of determination $\alpha$ at values of 0.75, 0.72 and 0.70 respectively. For the evaluation of the proximity motion detection algorithm illustrated in FIG. 8–FIG. 11, the difference in signal strength ($\Delta P$) was configured to be 20 dBm. Beacon intervals were set at values of 100 mS, 75 mS, 50 mS, 25 mS and 10 mS respectively. The number of signal strength samples that were used for regression analysis depends on the intervals shown in Table 1.

In the experiments the beacon intervals could not be changed (due to limitations of the hardware being used and not a limitation of the present inventive method), wherein results were only measured for intervals of 100 mS. From the illustrations in FIG. 8–FIG. 11, it is apparent that when the threshold of the coefficient of determination is below 0.70, the proximity motion can be detected with a high level of accuracy. It is also apparent that the standard beacon interval of 100 mS is sufficient for detecting proximity motion. It also appears that the technique is sufficiently robust for use with devices from a variety of manufacturers and with different beacon intervals allowing it to be applied to a wide variety of wireless 802.11b devices. It should be appreciated that although the embodiments describe use with the IEEE 802.11 wireless standard, it can be applied to any existing or future wireless standards which provide a means for communicating signal strengths between wireless network nodes.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Regression Analysis - Number of Samples Based on Interval

| Interval (mS) | No. Samples |
|---|---|
| 100 | 10 |
| 75 | 13 |
| 50 | 20 |
| 25 | 40 |

What is claimed is:

1. A system for detecting motion of a wireless device, comprising:

a first wireless device configured for communicating wirelessly with at least a second wireless device;

at least one of said wireless devices configured as a beacon sender for sending beacon frames containing signal strength information;

at least one of said wireless devices configured as a beacon receiver for receiving said beacon frames;

a computer processor associated with one of said wireless devices and configured for processing said signal strength information; and programming executable on said computer processor for performing acts comprising:

calculating, from said signal strength information, differences in signal strength for a plurality of signal strength samples accumulated during a sampling period;

performing a regression analysis on said differences in signal strength with respect to the number of samples in said plurality of signal strength samples;

calculating, as a result of said regression analysis, a coefficient of determination;

calculating, as a result of said regression analysis, a regression coefficient; and generating and outputting a proximity motion detection signal in response to determining that the regression coefficient is approximately equal to or greater than the quotient of (i) change in signal strength from start to end of the sampling period divided by (ii) the number of said plurality of signal strength samples, and further in response to determining that the coefficient of determination exceeds a threshold value.

2. A system as recited in claim 1, wherein said regression analysis is performed without regard to transmit power of the wireless devices.

3. A system as recited in claim 1, wherein said beacon frames comprise IEEE 802.11 network formatted data frames.

4. A system as recited in claim 1:
wherein said computer processor and said programming are associated with said beacon receiver.

5. A system as recited in claim 1:
wherein said computer processor and said programming are associated with said beacon sender; and
wherein said beacon receiver is configured to send said signal strength information to said beacon sender for processing.

6. A system as recited in claim 1, wherein said beacon frames are transmitted by the beacon sender at a predetermined transmission interval.

7. A system as recited in claim 6, wherein said predetermined transmission interval is at or less than approximately 100 milliseconds.

8. A system as recited in claim 1, wherein said programming further carries out the act of tuning an interval frequency for transmitting the beacon frames.

9. A system as recited in claim 1, wherein said programming is configured to detect motion in response to a defined signal strength change within the given time interval.

10. A system as recited in claim 9, wherein motion is detected if said signal strength change of approximately 20 dB arises within less than or equal to a time interval of approximately one second.

11. A system as recited in claim 1, wherein proximity motion occurs when said first wireless device moves toward said second wireless device to within less than or equal to approximately 15 centimeters.

12. A system as recited in claim 1, wherein proximity motion occurs when said first wireless device moves toward said second wireless device to within less than or equal to approximately 5 centimeters.

13. A system as recited in claim 12:
wherein proximity motion occurs when said first wireless device moves toward said second wireless device from a distance equal to or greater than approximately 30 centimeters to less or equal to approximately 15 centimeters.

14. A method of detecting motion between a first wireless device and a second wireless device, comprising:
monitoring signal strength information for a signal transmitted between said first wireless device and said second wireless device;
calculating, from said signal strength information, differences in signal strength for a plurality of signal strength samples accumulated during a sampling period;

performing a regression analysis on said differences in signal strength with respect to the number of samples in said plurality of signal strength samples;

calculating, as a result from said regression analysis, a regression coefficient;

calculating, as a result from said regression analysis, a coefficient of determination; and generating and outputting a proximity motion detection signal in response to determining that the regression coefficient is approximately equal to or greater than the quotient of (i) change in signal strength from start to end of the sampling period divided by (ii) the number of said plurality of signal strength samples, and further in response to determining that the coefficient of determination exceeds a threshold value.

15. A method as recited in claim 14, wherein proximity motion occurs when said first wireless device moves toward said second wireless device to within less than or equal to approximately 15 centimeters.

16. A method as recited in claim 14, wherein the proximity motion occurs when said first wireless device moves toward said second wireless device to within less than or equal to approximately 5 centimeters.

17. A method as recited in claim 14:
wherein at least one of said wireless devices is configured as a beacon sender for sending beacon frames containing signal strength information; and
wherein at least one of said wireless devices is configured as a beacon receiver for receiving said beacon frames.

18. A method as recited in claim 14, wherein proximity motion occurs when said first wireless device moves toward said second wireless device from a distance equal to or greater than approximately 30 centimeters to less or equal to approximately 15 centimeters.

19. A method as recited in claim 14:
wherein said regression analysis is performed without regard to transmit power of the wireless devices.

20. A method as recited in claim 17, wherein said beacon frames comprise IEEE 802.11 network formatted data frames.

21. A method as recited in claim 17, wherein said beacon receiver is configured for processing said signal strength information.

22. A method as recited in claim 17:
wherein said beacon sender is configured for processing said signal strength information; and
wherein said beacon receiver is configured to send said signal strength information to said beacon sender for processing.

23. A method as recited in claim 17, wherein said beacon frames are sent by the beacon sender at a predetermined transmission interval.

24. A method as recited in claim 23, wherein said predetermined transmission interval is at or less than approximately 100 milliseconds.

25. A method as recited in claim 17, further comprising tuning an interval frequency for sending the beacon frames.

26. A method as recited in claim 17 further comprising detecting motion in response to a defined signal strength change within the given time interval.

27. A method as recited in claim 26, wherein motion is detected if said signal strength change of approximately 20 dB arises within less than or equal to a time interval of approximately one second.

28. A method of detecting motion between a first wireless node and a second wireless node, comprising:
- continuously monitoring beacon frames transmitted by said second wireless node to said first wireless node;
- accumulating signal strength information contained in the beacon frames transmitted by said second wireless node;
- calculating, from said accumulated signal strength information, differences in signal strength for a plurality of signal strength samples accumulated during a sampling period;
- performing a regression analysis on said differences in signal strength with respect to the number of samples in said plurality of signal strength samples;
- calculating, as a result of said regression analysis, a coefficient of determination;
- calculating, as a result of said regression analysis, a regression coefficient; and
- generating and outputting a proximity motion detection signal in response to determining that the regression coefficient is approximately equal to or greater than the quotient of (i) change in signal strength from start to end of the sampling period divided by (ii) the number of said plurality of signal strength samples, and further in response to determining that the coefficient of determination exceeds a threshold value.

29. A method as recited in claim 28, wherein the threshold value for the coefficient of determination is approximately 0.70.

30. A method as recited in claim 28, wherein the threshold value for the coefficient of determination is approximately 0.75.

31. A method of detecting motion of a mobile wireless device with respect to a stationary wireless device in a wireless network, the method comprising:
- calculating signal strength differences between the mobile wireless device and the stationary wireless device as the mobile wireless device approaches the stationary wireless device for a plurality of samples;
- performing a regression analysis on said signal strength differences with respect to said plurality of samples;
- calculating, from said regression analysis, a coefficient of determination,
- calculating, from said regression analysis, a regression coefficient; and
- determining that the mobile wireless device has moved into proximity with the stationary wireless device and outputting a proximity motion detection signal in response to determining that the regression coefficient is approximately equal to or greater than the quotient of (i) change in signal strength from start to end of the sampling period divided by (ii) the number of said plurality of signal strength samples, and further in response to determining that the coefficient of determination exceeds a threshold value.

32. A method as recited in claim 31, wherein the stationary wireless device and the mobile wireless device are configured in IBSS mode and wherein the mobile wireless device is configured as an access point node.

33. A method as recited in claim 31, wherein calculating the signal strength difference between the mobile wireless device and the fixed wireless device is performed with respect to accumulated signal strength information within a plurality of recorded signal strength samples.

34. A method as recited in claim 33, wherein said regression analysis comprises performing a linear regression analysis on the difference in signal strengths on the signals transmitted between the mobile wireless device and the fixed wireless device with respect to the number of samples to determine said regression coefficient of the signal strengths.

35. A method as recited in claim 34, wherein said regression analysis comprises performing a linear regression analysis on the difference in signal strengths on the signals transmitted between the mobile wireless device and the fixed wireless device with respect to the number of samples to determine said coefficient of determination of the signal strength.

36. A method as recited in claim 31, wherein the threshold value for the coefficient of determination is approximately 0.70.

37. A method as recited in claim 31, wherein the threshold value for the coefficient of determination is approximately 0.75.

* * * * *